United States Patent
Inzunza Figueroa et al.

(10) Patent No.: US 9,948,207 B2
(45) Date of Patent: Apr. 17, 2018

(54) INVERTER CONTROL APPARATUS

(71) Applicant: Toshiba Mitsubishi-Electric Industrial Systems Corporation, Chuo-ku (JP)

(72) Inventors: Ruben Alexis Inzunza Figueroa, Tokyo (JP); Takeshi Sumiya, Tokyo (JP); Tatsuaki Ambo, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/187,096

(22) Filed: Jun. 20, 2016

(65) Prior Publication Data

US 2016/0308464 A1 Oct. 20, 2016

Related U.S. Application Data

(63) Continuation of application No. PCT/JP2013/084271, filed on Dec. 20, 2013.

(51) Int. Cl.
*H02M 7/537* (2006.01)
*H02M 1/12* (2006.01)
(Continued)

(52) U.S. Cl.
CPC ............. *H02M 7/537* (2013.01); *H02J 3/383* (2013.01); *H02J 3/385* (2013.01); *H02M 1/12* (2013.01); *H02M 1/14* (2013.01); *H02M 7/48* (2013.01)

(58) Field of Classification Search
CPC ..... H02M 3/33507; H02M 2001/0032; H02M 1/08; H02M 2001/0048;
(Continued)

(56) References Cited

U.S. PATENT DOCUMENTS 5,892,354 A * 4/1999 Nagao ....................... G05F 1/67
   323/299
9,647,574 B2 * 5/2017 Chapman .......... H02M 7/53871
(Continued)

FOREIGN PATENT DOCUMENTS

JP    4-248371    9/1992
JP    9-294380    11/1997
(Continued)

OTHER PUBLICATIONS

International Search Report dated Apr. 1, 2014 in PCT/JP2013/084271 filed Dec. 20, 2013 (with English translation).
(Continued)

*Primary Examiner* — Henry Lee, III
(74) *Attorney, Agent, or Firm* — Oblon, McClelland, Maier & Neustadt, L.L.P.

(57) ABSTRACT

There is provided an inverter control apparatus, a capacitor being provided on an AC side of the inverter. The apparatus includes a system voltage detector detects a system voltage, a differentiation unit calculates a differential value of the system voltage, a correction current instruction value calculator calculates a correction current instruction value for correcting a current instruction value set for an output current of the inverter, based on the differential value of the system voltage, a current instruction value correction unit corrects the current instruction value, based on the correction current instruction value, and a controller controls the inverter based on the current instruction value.

9 Claims, 4 Drawing Sheets

(51) Int. Cl.
*H02J 3/38* (2006.01)
*H02M 7/48* (2007.01)
*H02M 1/14* (2006.01)

(58) Field of Classification Search
CPC ......... H02M 2003/1566; H02M 3/335; H02M 3/33523; H02M 3/33576; H02M 3/3376; Y02B 70/16; Y02B 70/1433; G05F 1/468; G05F 1/56; G05F 1/575; G05F 1/46; G05F 3/267; G05F 3/26
See application file for complete search history.

(56) References Cited

U.S. PATENT DOCUMENTS

| | | | | |
|---|---|---|---|---|
| 2006/0171182 | A1* | 8/2006 | Siri ................... | H02M 3/33592 363/131 |
| 2007/0236187 | A1* | 10/2007 | Wai .................. | H02J 3/383 323/222 |
| 2008/0291707 | A1* | 11/2008 | Fang ................. | H02M 1/40 363/41 |
| 2010/0236612 | A1* | 9/2010 | Khajehoddin ............ | G05F 1/67 136/252 |
| 2011/0255307 | A1* | 10/2011 | Kim ................... | H02J 3/383 363/13 |
| 2011/0261601 | A1* | 10/2011 | Chapman .......... | H02M 3/33523 363/131 |
| 2012/0106221 | A1* | 5/2012 | Ochi ................ | H02M 7/53871 363/132 |
| 2012/0287687 | A1* | 11/2012 | Lin ................... | H02M 7/53871 363/95 |
| 2013/0027993 | A1* | 1/2013 | Tan ....................... | H02M 7/515 363/40 |
| 2015/0256095 | A1* | 9/2015 | Ohta ................... | H02M 7/4826 363/37 |

FOREIGN PATENT DOCUMENTS

| | | |
|---|---|---|
| JP | 2001-309561 | 11/2001 |
| JP | 2003-333753 | 11/2003 |
| JP | 2005-210823 | 8/2005 |
| WO | WO 2012/114467 A1 | 8/2012 |
| WO | WO 2012/114468 A1 | 8/2012 |
| WO | WO 2012/114469 A1 | 8/2012 |

OTHER PUBLICATIONS

Written Opinion dated Apr. 1, 2014 in PCT/JP2013/084271 filed Dec. 20, 2013.
Combined Chinese Office Action and Search Report dated Sep. 29, 2017 in Patent Application No. 201380080867.6 (with English language translation and English translations of categories of cited documents).
Extended European Search Report dated Jul. 13, 2017 in Patent Application No. 13899883.6.
E. Paal, et al. "Grid Management Functions built in PV Inverters for Distributed Power Generation" 8$^{th}$ International Conference on Power Electronics, XP 031956345, 2011, pp. 2637-2644.

* cited by examiner

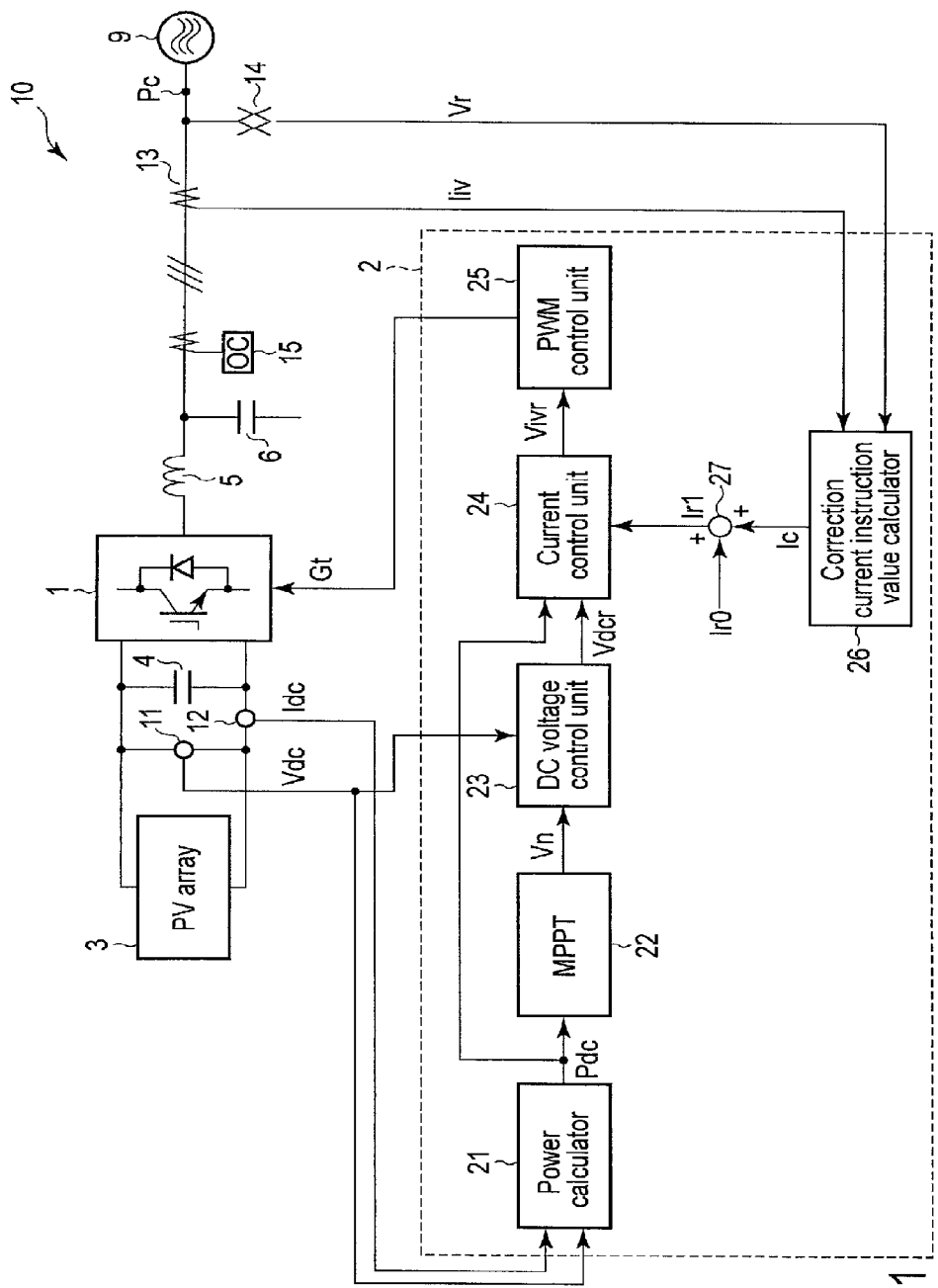
F I G. 1

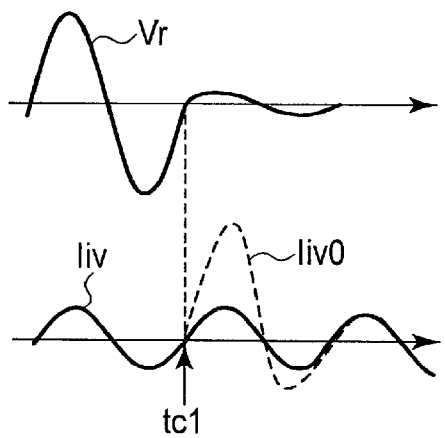
F I G. 2
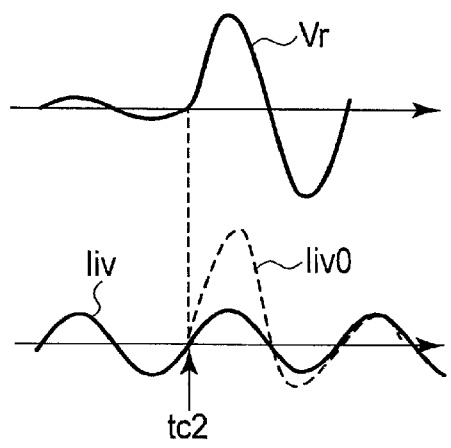
F I G. 3

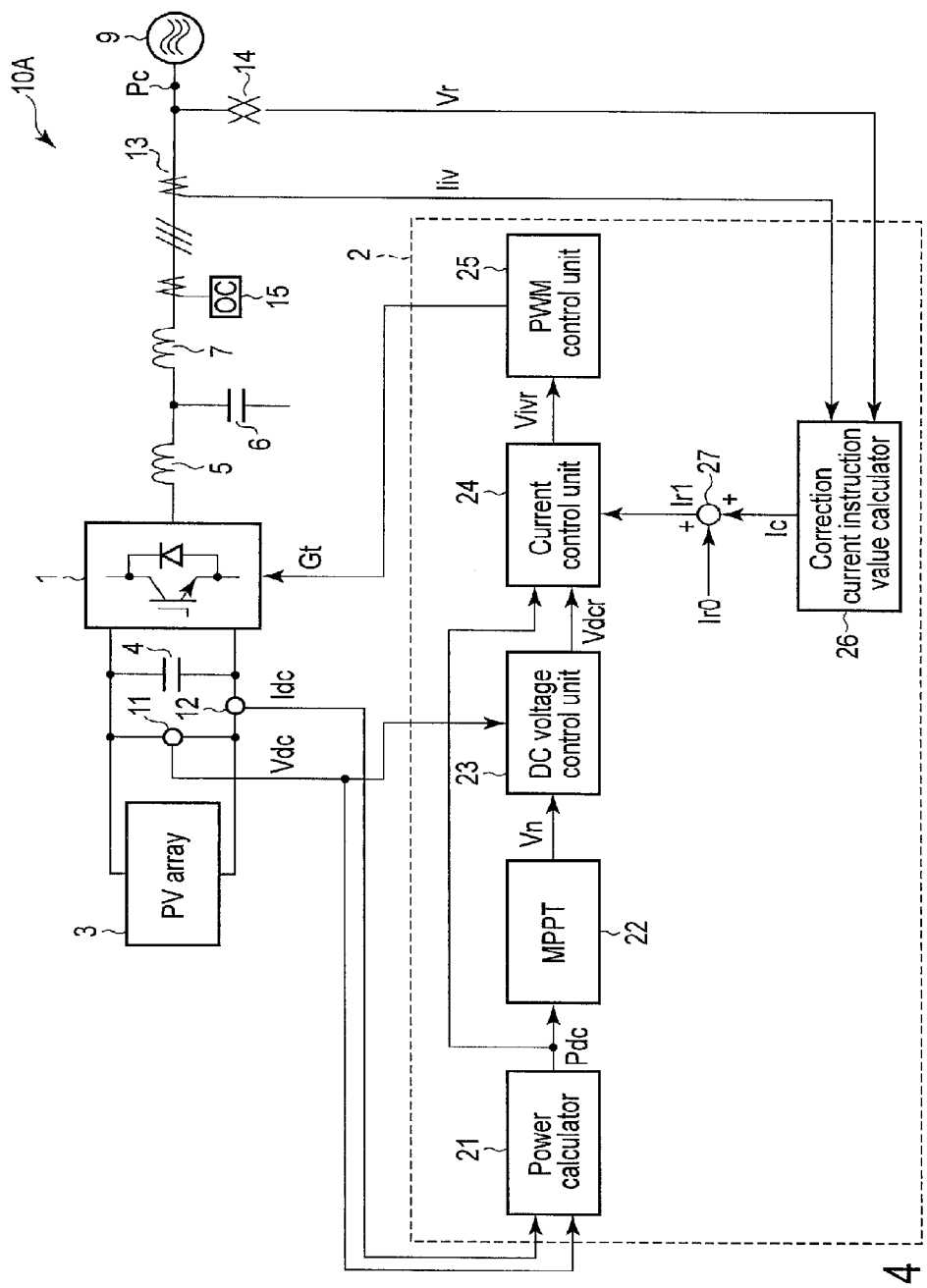
F I G. 4

US 9,948,207 B2

INVERTER CONTROL APPARATUS

CROSS REFERENCE TO RELATED APPLICATIONS

This application is a Continuation Application of PCT Application No. PCT/JP2013/084271, filed Dec. 20, 2013, the entire contents of which are incorporated herein by reference.

BACKGROUND OF THE INVENTION

1. Field of the Invention

The present invention relates to an inverter control apparatus for controlling an inverter that interconnects with an alternating-current (AC) power system.

2. Description of the Related Art

An inverter that interconnects with an AC power system is well known. There is a case where an AC capacitor is provided on the AC side of the inverter interconnecting with the AC system, in order to control a ripple component output from the inverter.

When the system voltage drops, the amplitude of a ripple current output from the inverter will increase. Therefore, an overcurrent relay may perform a protective operation to thereby trip a circuit breaker, even if the fundamental wave component of the output current of the inverter does not reach a level that requires the protective operation. To avoid this, it is disclosed that an inverter is controlled by increasing the frequency of a carrier wave when a drop in the system voltage has been detected (see Patent Document 1). Similarly, it is disclosed that a limit value for limiting a current instruction value for the inverter is reduced when a drop in the system voltage has been detected (see Patent Document 2). Yet further, it is disclosed that a direct-current (DC) voltage applied to the inverter is increased when a drop in the system voltage has been detected (see Patent Document 3).

However, when the system voltage abruptly varies because of, for example, failure of the power system, the AC capacitor repeats charge and discharge in accordance with the variation, with the result that an over current may be output from the inverter. This over current may not be sufficiently suppressed and the circuit breaker may be tripped, if the inverter is controlled after the inverter control apparatus detects it.

PATENT DOCUMENTS

[Patent Document 1] WO 2012/114467 A1
[Patent Document 2] WO 2012/114468 A1
[Patent Document 3] WO 2012/114469 A1

BRIEF SUMMARY OF THE INVENTION

An object of the present invention is to provide an inverter control apparatus capable of suppressing an over current due to an abrupt change in a system voltage.

In accordance with an aspect of the present invention, there is provided an inverter control apparatus which is configured to control an inverter interconnected to an alternating-current power system, a capacitor being provided on an alternating-current side of the inverter. The apparatus comprises a system voltage detector configured to detect a system voltage of the alternating-current power system; a differentiation unit configured to calculate a differential value of the system voltage detected by the system voltage detector; a correction current instruction value calculator configured to calculate a correction current instruction value for correcting a current instruction value set for an output current of the inverter, based on the differential value of the system voltage calculated by the differentiation unit; a current instruction value correction unit configured to correct the current instruction value, based on the correction current instruction value calculated by the correction current instruction value calculator; and a controller configured to control the inverter based on the current instruction value corrected by the current instruction value correction unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a photovoltaic system according to a first embodiment of the invention.

FIG. 2 is a waveform chart showing a change in output current occurring when the system voltage is reduced under control of a control device according to the first embodiment.

FIG. 3 is a waveform chart showing a change in output current occurring when the system voltage is increased under control of the control device according to the first embodiment.

FIG. 4 is a waveform chart showing a change in output current under control of the control device according to a second embodiment of the invention.

Figure 5:
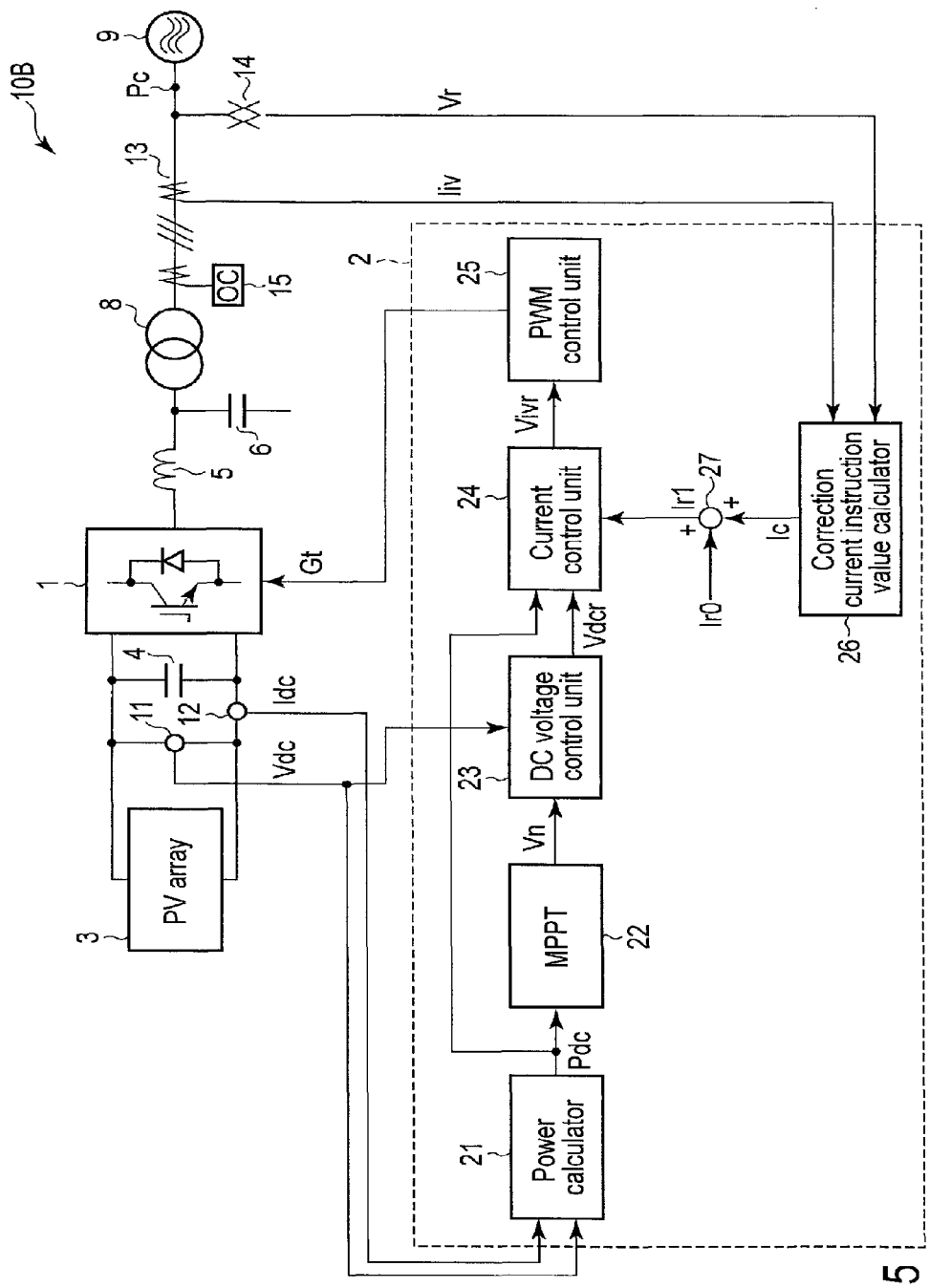
FIG. 5 is a waveform chart showing a change in output current under control of the control device according to a third embodiment of the invention.

DETAILED DESCRIPTION OF THE INVENTION (First Embodiment)

FIG. 1 is a block diagram showing the configuration of a photovoltaic system 10 according to a first embodiment of the invention. In the drawings below, like elements are denoted by like reference numbers, and only different elements will be described, with duplicate description appropriately omitted.

The photovoltaic system 10 is a distributed power supply system that interconnects with a three-phase alternating-current (AC) power system 9. The photovoltaic system 10 is connected to the power system 9 at an interconnect point Pc.

The photovoltaic system 10 comprises an inverter 1, a controller 2, a photovoltaic (PV) array 3, a smoothing capacitor 4, a reactor 5, a capacitor 6, a DC voltage detector 11, a DC current detector 12, an AC current detector 13, an AC voltage detector 14, and an overcurrent protection relay 15.

The overcurrent protection relay 15 is provided on the AC side (output side) of the inverter 1. The overcurrent protection relay 15 may be provided anywhere in the photovoltaic system 10 or in the power system 9. When detecting that the output current (system current) Iiv of the inverter 1 becomes an overcurrent that exceeds a predetermined value, the overcurrent protection relay 15 trips a breaker for breaking the output current Iiv. Thus, when the overcurrent protection relay 15 operates, the photovoltaic system 10 stops supply of electricity to the power system 9.

The PV array 3 is an aggregate of PV cells that generate electricity utilizing solar energy. The PV array 3 supplies the generated DC power to the inverter 1.

The inverter 1 is an inverter subjected to pulse width modulation (PWM) control. The inverter 1 converts electricity, generated by the PV array 3, into AC power that synchronizes with the system voltage of the power system 9, and supplies it to the power system 9. The inverter 1 is controlled by the controller 2. More specifically, a switching element that constitutes the power conversion circuit of the inverter 1 is driven by a gate signal Gt received from the controller 2, thereby controlling the output of the inverter 1.

The smoothing capacitor 4 is provided on the DC side of the inverter 1. The smoothing capacitor 4 smoothes DC power supplied from the PV array 3 to the inverter 1.

The reactor 5 and the capacitor 6 constitute an AC filter. The AC filter controls a ripple component output from the inverter 1.

The DC voltage detector 11 detects a DC voltage Vdc applied to the DC side of the inverter 1. The DC voltage detector 11 outputs the detected DC voltage Vdc as a detection signal to the controller 2.

The DC current detector 12 is a detector to measure a DC current Idc input to the DC side of the inverter 1. The DC current detector 12 outputs the detected DC current Idc as a detection signal to the controller 2.

The AC current detector 13 is a detector to measure the output current Iiv of the inverter 1. The AC current detector 13 outputs the detected output current Iiv as a detection signal to the controller 2.

The AC voltage detector 14 is a detector to measure the system voltage Vr of the power system 9. The AC voltage detector 14 outputs the detected system voltage Vr as a detection signal to the controller 2.

The controller 2 controls the inverter 1. Specifically, the controller 2 controls the output current Iiv of the inverter 1 to make it follow a predetermined current instruction value Ir. The controller 2 comprises a power calculator 21, a maximum power point tracker (MPPT) 22, a DC voltage control unit 23, a current control unit 24, a PWM control unit 25, a correction current instruction value calculator 26, and an adder 27.

The power calculator 21 calculates DC power Pdc generated by the PV array 3 based on the DC voltage Vdc detected by the DC voltage detector 11 and the DC current Idc detected by the DC current detector 12. The power calculator 21 outputs the calculated DC power Pdc to the MPPT 22.

The MPPT 22 outputs, to the DC voltage control unit 23, a voltage increase/decrease signal Vn indicating either an increase or a decrease in DC voltage, based on the DC power Pdc calculated by the power calculator 21. Thus, the MPPT 22 controls the DC voltage Vdc of the inverter 1 to make it follow a voltage (maximum power-point voltage) which always provides maximum power (maximum power-point tracking control).

The DC voltage control unit 23 receives the DC voltage Vdc detected by the DC voltage detector 11 and the voltage increase/decrease signal Vn determined by the MPPT 22. The DC voltage control unit 23 calculates a DC voltage instruction value Vdcr as an instruction for the DC voltage Vdc in accordance with the voltage increase/decrease signal Vn. The DC voltage control unit 23 outputs the calculated DC voltage instruction value Vdcr to the current control unit 24.

The correction current instruction value calculator 26 receives the output current Iiv detected by the AC current detector 13 and the system voltage Vr detected by the AC voltage detector 14. The correction current instruction value calculator 26 calculates a correction current instruction value Ic using the following equation. The correction current instruction value calculator 26 outputs the calculated correction current instruction value Ic to the adder 27.

$$Ic = Vr \cdot C \cdot s \qquad (1)$$

where C is the capacitance of the capacitor 6, s is the Laplace operator, and Vr is the root-mean-square value of system voltage.

That is, the correction current instruction value calculator 26 calculates the correction current instruction value Ic as the product of a value obtained by differentiating the system voltage Vr, and the capacitance C of the capacitor 6. The correction current instruction value Ic may be calculated by multiplying the value, obtained by the above equation, by, for example, a gain. The capacitance C is preset in the correction current instruction value calculator 26. In calculation processing by a computer in the controller 2, the system voltage Vr is a value obtained by converting, into a root-mean-square value, a sampling value (instantaneous value) of the system voltage Vr detected in the power system 9.

By calculating the correction current instruction value Ic based on the value obtained by differentiating the system voltage Vr, the controller 2 can correct the current instruction value Ir when the system voltage Vr starts to vary. If the system voltage Vr is in a steady state (in a state where the root-mean-square value of the system voltage Vr is constant), the differential value of the root-mean-square value of the system voltage Vr is zero, and hence the correction current instruction value Ic is also zero. Further, by calculating the correction current instruction value Ic using the capacitance C of the capacitor 6, the current instruction value Ir can be corrected to offset increases and decreases in the output current Iiv due to charging/discharging of the capacitor 6.

The correction current instruction value Ic calculated by the correction current instruction value calculator 26 is input to the adder 27. The adder 27 outputs, to the current control unit 24, a current instruction value Ir1 obtained by adding the correction current instruction value Ic to a preset current instruction value Ir0. The preset current instruction value Ir0 is the value of a current output from the inverter 1 when the system voltage Vr is in a steady state (in a state where no current correlation is performed).

The DC power Pdc calculated by the power calculator 21, the DC voltage instruction value Vdcr calculated by the DC voltage control unit 23, and the current instruction value Ir1 corrected by the adder 27 are input to the current control unit 24. The current control unit 24 calculates a voltage instruction value Vivr for controlling the output voltage of the inverter 1, based on the DC power Pdc, the DC voltage instruction value Vdcr and the current instruction value Ir1. The current control unit 24 calculates a voltage instruction value Vivr for causing the DC voltage Vdc of the inverter 1 to follow the DC voltage instruction value Vdcr, and causing the output current Iiv of the inverter 1 to follow the current instruction value Ir1. The current control unit 24 outputs the calculated voltage instruction value Vivr to the PWM control unit 25.

The PWM control unit 25 receives the voltage instruction value Vivr calculated by the current control unit 24. The PWM control unit 25 generates a gate signal Gt for adjusting the output voltage of the inverter 1 to the voltage instruction value Vivr. The gate signal Gt drives a switching element constituting the power conversion circuit of the inverter 1. Thus, the inverter 1 is PWM-controlled.

Referring now to FIGS. 2 and 3, a description will be given of changes in the output current Iiv of the inverter 1 that occur under control of the controller 2 when the system voltage Vr has changed abruptly. FIG. 2 is a waveform chart showing a change in the output current Iiv when the system voltage Vr has dropped. FIG. 3 is a waveform chart showing a change in the output current Iiv when the system voltage Vr has increased. In FIGS. 2 and 3, the horizontal axis represents time, and tc1 and tc2 represent the times when the system voltage Vr abruptly changes.

Unless correlation based on the correction current instruction value Ic is performed at time tc1 when the system voltage Vr abruptly drops as shown in FIG. 2, the output current Iiv0 abruptly increases because of discharge of the capacitor 6, as is indicated by the broken line. In contrast, when correlation based on the correction current instruction value Ic is performed, the output current Iiv little changes before and after time tc1 even if the capacitor 6 is discharged, as is indicated by the solid line.

Similarly, unless correlation based on the correction current instruction value Ic is performed at time tc2 when the system voltage Vr abruptly rises as shown in FIG. 3, the output current Iiv0 abruptly increases because of charging of the capacitor 6, as is indicated by the broken line. In contrast, if correlation based on the correction current instruction value Ic is performed, the output current Iiv little changes before and after time tc2 even if the capacitor 6 is charged, as is indicated by the solid line.

In the embodiment, the output current Iiv of the inverter 1 can be corrected when the system voltage Vr has started an abrupt change, by controlling the inverter 1 based on the differential value of the system voltage Vr. As a result, unnecessary operation of the overcurrent protection relay 15 because of the abrupt change of the system voltage Vr can be avoided.

Further, the output current Iiv of the inverter 1, which fluctuates because of charging/discharging of the capacitor 6 performed in accordance with abrupt change of the system voltage Vr, can be more effectively suppressed by calculating the correction current instruction value Ic for correcting the output current Iiv of the inverter 1, based on the capacitance C of the capacitor 6.

(Second Embodiment)

FIG. 4 is a block diagram showing the configuration of a photovoltaic system 10A according to a second embodiment of the invention.

The photovoltaic system 10A is obtained by further providing, in the photovoltaic system 10 of the first embodiment shown in FIG. 1, an interconnect reactor 7 closer to the power system 9 than the reactor 5. The other structure of the photovoltaic system 10A is similar to the photovoltaic system 10 of the first embodiment.

In addition to the advantages of the first embodiment, the second embodiment is further advantageous in that the photovoltaic system 10A is also connectable to the power system 9 in which the interconnect reactor, for example, is not provided.

(Third Embodiment)

FIG. 5 is a block diagram showing the configuration of a photovoltaic system 10B according to a third embodiment of the invention.

The photovoltaic system 10B is obtained by further providing, in the photovoltaic system 10 of the first embodiment shown in FIG. 1, an interconnect transformer 8 closer to the power system 9 than the reactor 5. The other structure of the photovoltaic system 10B is similar to the photovoltaic system 10 of the first embodiment.

In addition to the advantages of the first embodiment, the third embodiment is further advantageous in that the photovoltaic system 10B is also connectable to the power system 9 in which the interconnect transformer, for example, is not provided.

In each of the above embodiments, the configurations of the photovoltaic systems have been described. However, the invention is not limited to them. Other distributed power supply systems, such as wind power generation and hydraulic power generation systems, can be constructed like the above-described embodiments.

In each embodiment, the controller 2 may control the output current Iiv of the inverter 1 by controlling its active power component and reactive power component separately. In this case, the controller 2 is configured to set different instruction values, instead of the current instruction value Ir0, for the active power component and the reactive power component, and to set a power factor. This setting enables the embodiments to be configured as described above.

In each embodiment, the correction current instruction value Ic is calculated using equation (1). However, the invention is not limited to this. It is sufficient if the correction current instruction value Ic is calculated based on the differential value of the system voltage Vr. The correction current instruction value can prevent the output current Iiv of the inverter 1 from quickly reacting to an abrupt change in the system voltage Vr to become an overcurrent.

In each embodiment, the inverter 1 is assumed to be a voltage stiff type inverter. However, it may be a current stiff type inverter.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. An inverter control apparatus which is configured to control an inverter interconnected to an alternating-current power system, a capacitor being provided on an alternating-current side of the inverter, the apparatus comprising:
 a system voltage detector configured to detect a system voltage of the alternating-current power system;
 a differentiation circuit configured to calculate a differential value of the system voltage detected by the system voltage detector;
 a correction current instruction value calculator configured to calculate a correction current instruction value for correcting a current instruction value set for an output current of the inverter, based on the differential value of the system voltage calculated by the differentiation circuit;

an adder configured to receive the correction current instruction value generated from the correction current instruction value calculator that receives the detected system voltage from the system voltage detector, add the correction current instruction value to a preset current instruction value, and output a current instruction value; and a controller configured to control the inverter based on the current instruction value.

2. The inverter control apparatus of claim 1, wherein the correction current instruction value calculator calculates the correction current instruction value based on a capacitance of the capacitor.

3. A distributed power supply system comprising:
an inverter interconnected to an alternating-current power system;
a capacitor provided on an alternating-current side of the inverter;
a system voltage detector configured to detect a system voltage of the alternating-current power system;
a differentiation circuit configured to calculate a differential value of the system voltage detected by the system voltage detector;
a correction current instruction value calculator configured to calculate a correction current instruction value for correcting a current instruction value set for an output current of the inverter, based on the differential value of the system voltage calculated by the differentiation circuit;
an adder configured to receive the correction current instruction value generated from the correction current instruction value calculator that receives the detected system voltage from the system voltage detector, add the correction current instruction value to a preset current instruction value, and output a current instruction value; and
a controller configured to control the inverter based on the current instruction value.

4. The distributed power supply system of claim 3, wherein the correction current instruction value calculator calculates the correction current instruction value based on a capacitance of the capacitor.

5. A control method of controlling an inverter which is interconnected to an alternating-current power system, a capacitor being provided on an alternating-current side the inverter, the control method comprising:
detecting, by a system voltage detector, a system voltage of the alternating-current power system;
calculating a differential value of the detected system voltage;
calculating, by a correction current instruction value calculator, a correction current instruction value for correcting a current instruction value set for an output current of the inverter, based on the calculated differential value;
receiving, by an adder, the correction current instruction value calculated from the correction current instruction value calculator that receives the detected system voltage from the system voltage detector, adding the correction current instruction value to a preset current instruction value, and outputting a current instruction value; and
controlling the inverter based on the corrected current instruction value.

6. The control method of claim 5, wherein the correction current instruction value is calculated based on a capacitance of the capacitor.

7. The inverter control apparatus of claim 1, wherein the correction current instruction value calculator calculates the correction current instruction value in such a manner that the larger the differential value, the more strongly a change in the output current of the inverter is restrained.

8. The distributed power supply system of claim 3, wherein the correction current instruction value calculator calculates the correction current instruction value in such a manner that the larger the differential value, the more strongly a change in the output current of the inverter is restrained.

9. The control method of claim 5, wherein the correction current instruction value is calculated in such a manner that the larger the differential value, the more strongly a change in the output current of the inverter is restrained.

* * * * *